J. Andrews,
Mortising Machine.
N° 752.  Patented May 30, 1838.
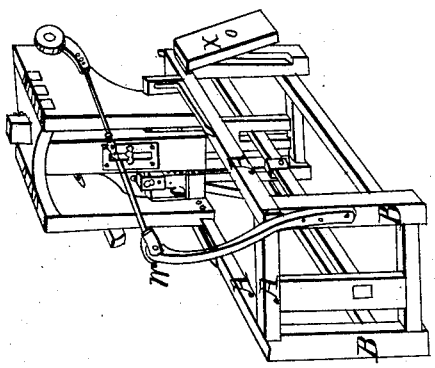
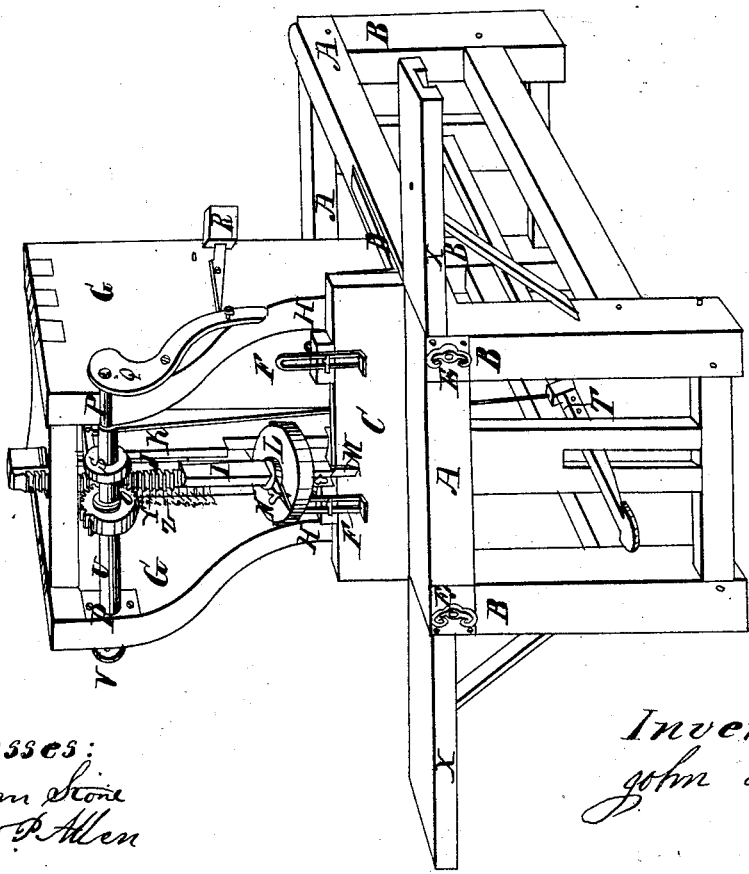
Witnesses:
Ephraim Stone
John P. Allen
Inventor:
John Andrews

UNITED STATES PATENT OFFICE.

JOHN ANDREWS, OF SUDBURY, MASSACHUSETTS.

MACHINE FOR MORTISING TIMBER, &c.

Specification of Letters Patent No. 752, dated May 30, 1838.

*To all whom it may concern:*

Be it known that I, JOHN ANDREWS, of Sudbury, in the county of Middlesex and State of Massachusetts, have invented a new and useful Improvement in Mortising-Machines; and I do hereby declare that the following is a full and exact description of the construction and operation of the said machine as improved by me.

A A A A represents an oblong square frame of wood two feet wide and three feet long more or less with four corner supporters B B B B three feet high—the whole made of three inch stuff more or less. About eight inches from the front top surface of said frame is placed a sliding gage board (C) for regulating the thickness of the stuff to be mortised the said gage board is two feet long and ten inches perpendicular width and one inch thick more or less. At each end of the gage board is a metal knee affixed (D D) on the back side of this board remember it is screwed on and moves horizontally and on the under surface of each knee is a tenon affixed or cast to slide within a groove in the middle of each side frame and moves as above described, the said gage board being regulated by two screws as seen at (E E) and passing through the said tenon and also through the side frame. On the gage board are two metal sliding clamps (F F) to secure the stuff while being worked in any desirable position. The said clamps are held fast by a screw in the rear of each on the back of the gage board.

The chisel suspending frame (G G) is raised or elevated above the aforesaid frame two feet and eight inches the tape of which is ten inches wide and two inches thick the front sides of this frame are hollowed out to their base six inches as shown at (H H). On the chisel suspending frame on the front of the center post or brace is attached so as to move perpendicularly a square arbor or slide (I) ⅞ of an inch square and ten inches long is attached to a rack (J) by a couple or swivel joint by a round tenon inserted in the lower end of the rack with a pin put through the rack so as bear on the tenon on the slide or arbor in a groove turned around the said tenon which enables the arbor to revolve without extracting. The rack is screwed on to a piece of wood which plays perpendicularly in a groove on the center post or brace (K) this post two feet eight inches long with four inches front width and five inches depth or thickness the said groove in the post for the rack to slide in to be fourteen inches long and at the lower end of the rack or fourteen inches from the top is notched in about one third of its thickness the distance above the notch is to be the length of each fourteen inches this notch is cut to receive the index which is to move when required as when the chisel is required to be raised or lowered to mortise stuff of different dimension the index is marked (L). And at ten inches below the first notch is another of sufficient depth to receive the gage board (G). From the gage board upward to the first mentioned notch it is mortised through to receive an arm of the index (L) this arm is about one inch square and passes through the post and is secured in its desired position by a screw on the back of the post.

The index (L) is of the following form made round four inches in diameter one inch thick and on each side of the index on the top surface is an elevation one fourth of an inch three fourths long to secure the chisel (M) when it is only necessary to turn it from right to left to head down the mortise. Through this projecting band by which the chisel is turned or changed is a screw (N) with a sharp point and when the hand is moved the screw passes within the elevation and does not touch the index when only desired to be changed as above described but when desired to be set on different angles the screw is turned down so as to play into small holes for that purpose and then turned back if necessary. The above band is confined to the box which passes through the index with a collar on the top and bottom of the box on the lower side the collar is pinned on the top is solid with the box the band is pinned on or screwed as a hole drilled into the collar and the band inserted as desired the inside of this box is square through which the sliding arbor (I) passes. The index (L) is moved in order to keep it at the most convenient distance from the operation of the chisel (M) to hold and keep the chisel firm or steady. The rack (K) is moved in its perpendicular slide for depressing the chisel by means of a pinion (O) which pinion may be four inches diameter which is fixed on a shaft which passes through horizontally through the sides of the frame at (P P). On the right end of said pinion shaft is a slip lever (Q) for the purpose of throwing the pinion out of gear when raising or lowering the chisel for mortising stuff of different depths a button (R) is placed in the rear of this lever for securing the lever in its desired position when the chisel is operating the said button is the heaviest at the opposite end which causes it to drop and secures the lever (Q) in its proper place while the pinion is operating. About midway between the lever (Q) and pinion (O) is a metal driving lever (S) firmly fixed on the pinion shaft this driving lever projects about one foot horizontally to the rear at which place as at different places on the lever a rod is connected and passes downward to a foot lever (T) to which it may be confined in the most convenient manner as thought proper.

On the extreme left of the pinion shaft (U) is an extending lever (V) from which a rod passes to an upright wood or metal spring (W) which spring is placed on the extreme left corner post which raises the chisel at every operation and is made to take up in the middle when necessary. On each of the sides of the lower frame is a movable rest (X X) hinged to the upper edge of the frame to support long stuff under operation or may let down to the side of the frame or posts these rests are two feet long and as wide as thought necessary. On the left of rack (J) on the front of the center post or brace (K) is confined to the post a scale made of metal and marked (Y) graduated from one to ten inches and three fourths of an inch in width. And in the wood on which rack (J) is screwed a pointer (Z) is placed to note the distance on the scale (Y) by this scale and pointer the depth of the stuff to be mortised will be immediately ascertained. But I should have mentioned that when the rack (J) moves up it passes through the top bar that confines the top frame together at the top and thus I think I have described it as plain as I am able.

What I claim as my invention and desire to secure by Letters Patent is—

The mode of setting the chisel for various depths and the scale (Y) and pointer in combination therewith as above described and also the index for setting the chisel at any angle as above described.

JOHN ANDREWS.

Attest:
  ARTHUR GOODNOW, Jr.,
  MARK ANDREWS.